… [11] 3,887,323
[45] June 3, 1975

[54] DIE ASSEMBLY FOR HEAT-SEALING TUBING ENDS TO SHEETING IN TRANSVERSE RELATIONSHIP

[75] Inventor: William Richard Bratten, Waukegan, Ill.

[73] Assignee: Baxter Laboratories, Inc., Morton Grove, Ill.

[22] Filed: June 24, 1974

[21] Appl. No.: 482,387

[52] U.S. Cl. ............... 425/521; 156/120; 156/380; 425/110
[51] Int. Cl. ........................................... B29c 27/00
[58] Field of Search ........... 425/517, 520, 506, 508, 425/510, 392, 110, 174, 174.4, 394, 399, 425/416, 423, 521; 156/380, 293, 120

[56] References Cited
UNITED STATES PATENTS
2,230,879  2/1941  Bronson ............................ 156/120
3,355,340  11/1967  Calvert et al. ...................... 156/120

Primary Examiner—Francis S. Husar
Assistant Examiner—R. J. Charvat
Attorney, Agent, or Firm—Garrettson Ellis

[57] ABSTRACT

A die assembly for sealing the end of a plastic tube or the like to a plastic sheet, so that the tube is sealed in transverse position to the sheeting. A first die has a first die face, which defines a protrusion surrounded by a generally flat face portion. The protrusion is received in the bore of the tubular member to be sealed. A tubular second die, for receiving the tube to be sealed, defines a second die face at one end thereof which is proportioned for cooperative sealing action with the first die face. In accordance with this invention, the protrusion of the first die face defines a concavely radiused junction area with the flat face portion, while the tubular second die defines an outwardly bevelled bore end portion. The bore end portion and the concavely radiused surface cooperate to facilitate the spreading of the end of the tubular member outwardly over the sheet during sealing, to create a seal of increased strength.

7 Claims, 4 Drawing Figures

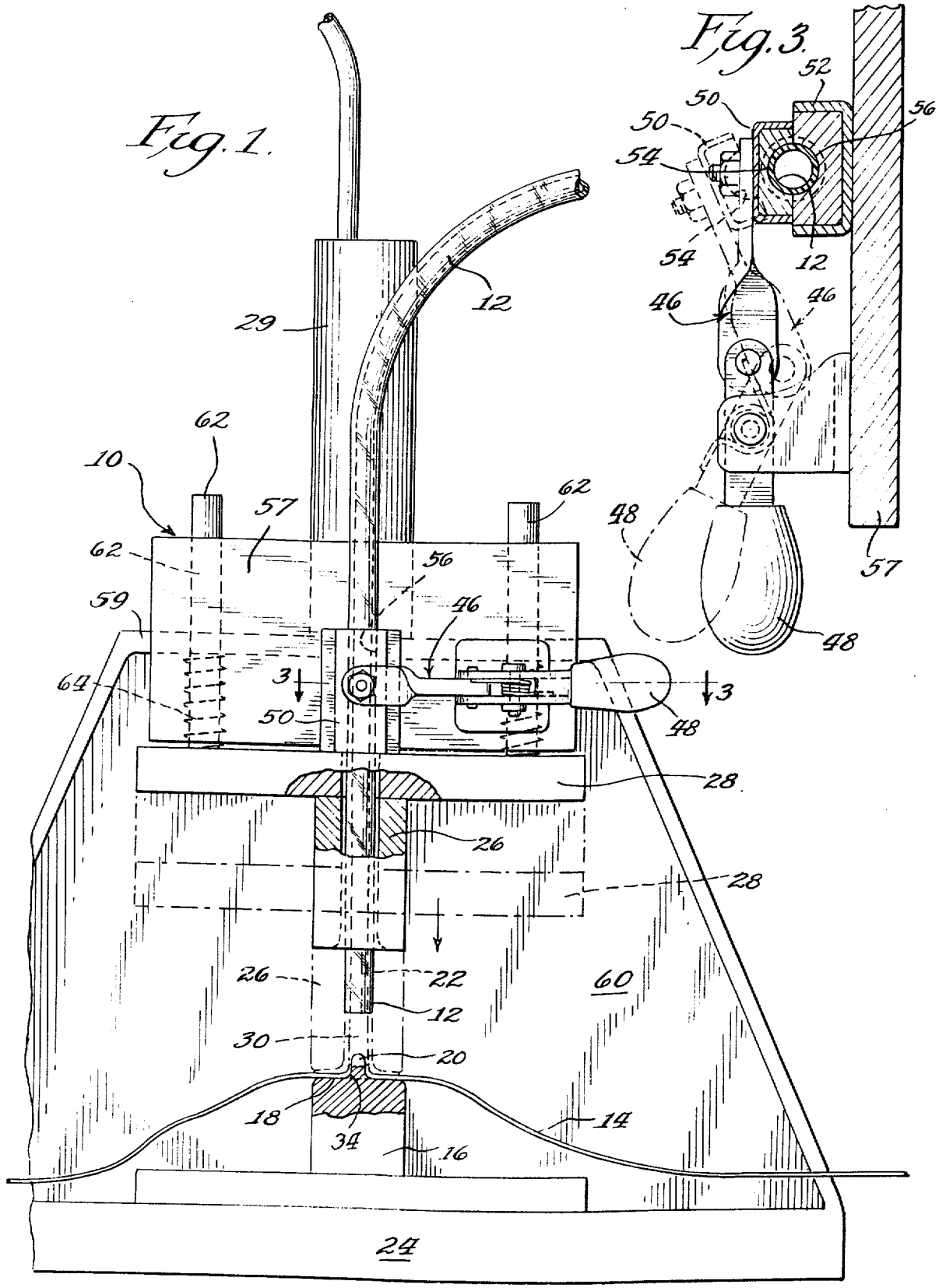

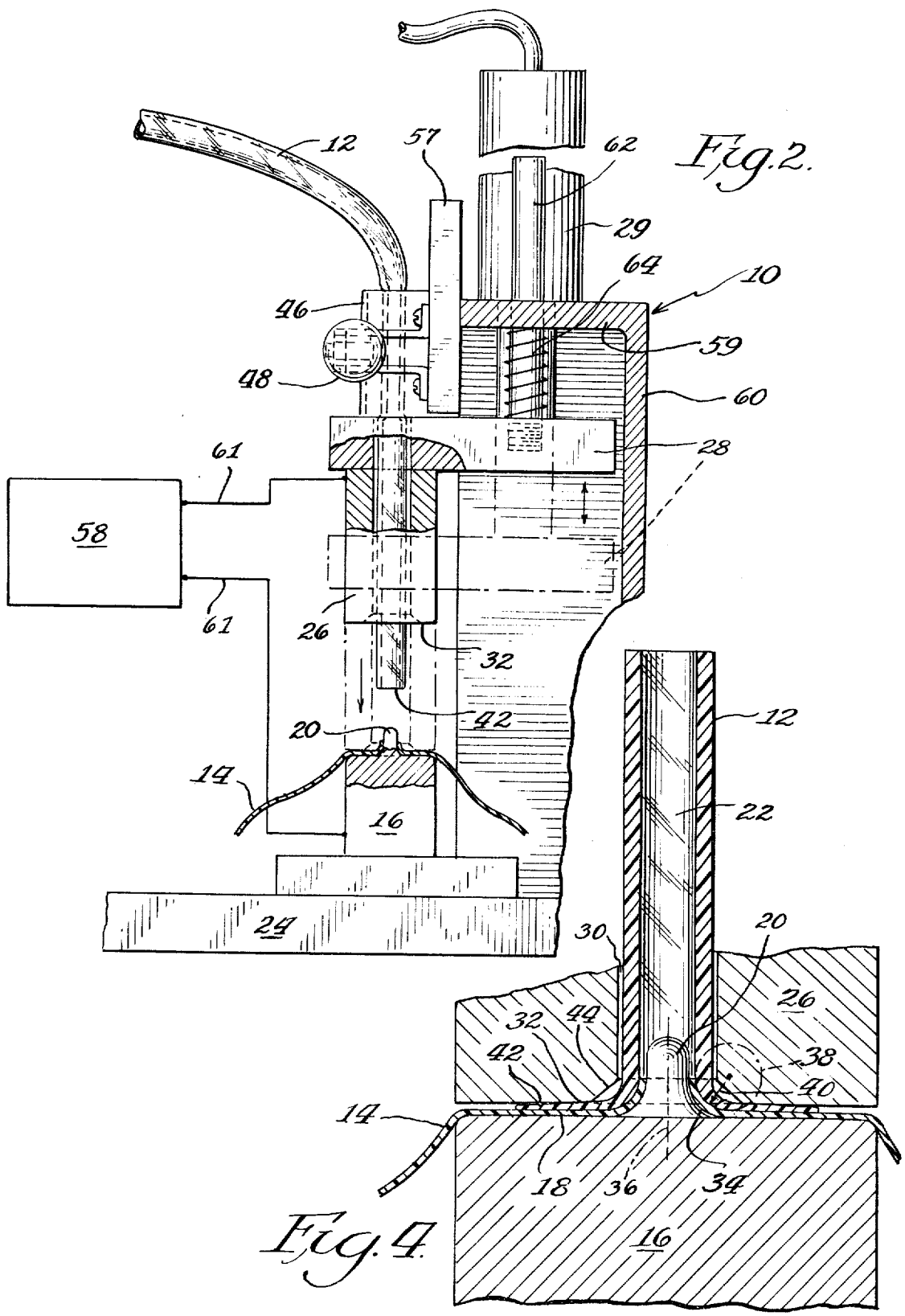

DIE ASSEMBLY FOR HEAT-SEALING TUBING ENDS TO SHEETING IN TRANSVERSE RELATIONSHIP

BACKGROUND OF THE INVENTION

In plastic medical equipment such as inflatable shim members for membrane blood oxygenators or blood dialyzers, as well as many other plastic devices generally, it is desirable to provide a fluid inlet and outlet tube, which joins to plastic sheeting or the like in transverse or perpendicular relation. This configuration is highly convenient, and avoids the more complex technique of gaining access to a flexible plastic container made from peripherally heat-sealed plastic sheets by passing the access tubing between the heat-sealed plastic sheets, which involves a complex heat-sealing die, and a frequent failure of the heat seal at a point that the tubing passes between the sheets.

Hitherto however, junctions between the ends of perpendicularly positioned tubing with plastic sheeting have been undersirably weak, due in part to the lack of adequate surface area across which the tubing and plastic sheeting is joined. In the conventional manufacture of such structures, a pair of dies have been used. A first die is used defining a protrusion from a flat die face, which typically passes through a hole in the plastic sheeting to be sealed, and fits into the bore of the tubing to be sealed. A second, tubular die is then typically brought downwardly about the tubing to be sealed into sealing relationship with the first die, causing the end of the tubing to be sealed to melt and flow into sealing contact with the plastic sheeting.

However, as stated above, the above seal has exhibited a distinct tendency to fracture, which has limited its commercial use.

DESCRIPTION OF THE INVENTION

In accordance with this invention, an improved sealing die assembly is provided which creates a stronger seal between the transversely disposed tubing and flat sheeting, by causing the tubing end to spread uniformly outwardly, to create a larger and better-joined seal area than has been previously attainable under the circumstances stated. This creates a stronger seal.

In accordance with this invention, the protrusion of the first die face is improved by providing a junction area with the flat face portion of the first die face which is concavely curved, as measured along planes which include the longitudinal axis of the protrusion. The concavely curved surface typically defines, in such plane, arcs of closed curves having radii of at least about 1/32 inch. As a result, the curved surface which is so provided serves as an outward spreading aid for the tubing which is to be sealed, which increases the strength of the ultimate heat seal.

Furthermore, the tubular second die which coacts with the first die for heat-sealing action has a bore which defines, as part of the second die face, an outwardly bevelled bore end portion. Accordingly, the outwardly bevelled bore end portion and the concavely curved surface of the first die face can cooperate to facilitate the outward spreading of the end of the tubing to be sealed over a sheet member during the sealing process. Thus, a seal of increased strength is achieved.

It is generally preferred for the first die face of the die assembly of this invention to define arcs as described above of the concavely curved surfaces which have radii of about 1/16 to 1/8 inch. However, if large diameter tubing is to be sealed in accordance with this invention, it may be desirable to utilize a protrusion of the first die face in which the junction area defines said arcs having larger radii than 1/8 inch.

It is a further advantage of this invention to have a clamp member positioned to receive the tubing to be sealed, and to hold it in desired position within the tubular die during heat-sealing. This clamp member may preferably include a pair of movable clamping blocks for pressing together and clamping the plastic tubes to be sealed. Each block typically defines a cut-away channel portion, which channel portions cooperate to form a complete channel for receiving the tubing to be sealed. The channel desirably defines a cross-sectional shape, similar to the cross-sectional shape of the tubing to be sealed (which is usually circular), but of smaller dimension. Accordingly, the tubing to be sealed is firmly gripped in the clamp member when closed, but undesirable permanent defomation of the tubing as a result of such clamping can be avoided.

The die assembly of this invention is utilized in combination with a die energizing means for heat-sealing, which most typically is a commercial source for radio frequency current. Such die energizing apparatus is available from the J.A. Callanan Company of Chicago, Illinois.

In the drawings:

FIG. 1 is an elevational view, wih some portions broken away, of the die assembly and energizing unit of this invention.

FIG. 2 is an elevational view of the same die assembly and energizing unit, rotated 90° from the view of FIG. 1.

FIG. 3 is a sectional view taken along Line 3—3 of FIG. 1.

FIG. 4 is an enlarged fragmentary view taken in vertical section, with some portions broken away, showing the coaction of the die members of this invention, and the seal produced by them.

Referring to the drawings, an apparatus 10 for butt sealing the end of heat-sealable plastic tubing 12 or the like to a flat member such as flexible plastic sheeting 14 is disclosed. Sheet member 14 may be made of thermoplastic, such as polyvinyl plastisol sheeting, and may be used as an inflatable shim for a membrane oxygenator or a dialyzer, or any other desired use. In the above use, after the butt sealing operation with the apparatus disclosed herein, a periphery of sheet 14 will be heat-sealed to the periphery of another sheet to form a completed, inflatable member which can be inflated or deflated through tubing 12.

First die 16 defines a first die face 18 which defines a protrusion 20 surrounded by a generally flat face portion of die face 18. Protrusion 20 is proportioned to be received in the bore 22 of tubular member 12, passing through a perforation in sheet 14 as illustrated in FIG. 4.

First die 16 is carried on a pedestal or a platform 24 which may be constructed in a conventional manner in accordance with the specific method of heat-sealing to be used, and the like.

Second die 26 is conventionally carried on a platen 28, which may be raised or lowered by the action of piston 29 into heat-sealing engagement with first die member 16.

Second die 26 is tubular and defines bore 30 for receiving tube 12 for sealing. Tubular second die 26 defines a second die face 32 at one end thereof which is proportioned for cooperative sealing action with first die face 18. As shown in phantom in FIG. 1, second die 26 may be advanced by piston 29 so that protrusion 20 projects into the bore 30 of second die 26 with a portion of tube 12 and sheet 14 between them, for heat-sealing.

In accordance with this invention, protrusion 20 defines an annular junction area surface 34 adjacent the flat face portion of die face 18. Surface 34 is concavely curved, as measured along planes which include the longitudinal axis 36 of said protrusion. For example, FIG. 4 is a sectional view taken along one such plane which contains axis 36, and the concave nature of junction surface 34 in such plane is clearly visible. Furthermore, it is preferred for the concavely curved surface 34 to define, in said planes, arcs of closed curves having radii of at least 1/32 inch, and preferably about 1/16 to 1/8 inch. In FIG. 4, closed circle 38, which includes an arc defined by concave surface 34, is shown to have such a radius 40 of 3/32 inch.

The purpose of concave surface 34 is to serve to gently deflect the end portion 42 of tube 12 outwadly in a stretched shape, similar to that of a trumpet bell, over sheet member 14, to provide a smooth, intimately contacting seal of greater surface area and better adhesion than has hitherto been available in accordance with the prior art techniques.

Correspondingly, bore 30 of second die 26 defines, as part of second die face 32, an annular, outwardly bevelled bore end portin 44 which cooperates with concavely curved surface 34 to facilitate the spreading of end 42 of the tubular membr 12 outwardly over the sheet member 14, during sealing action as shown in FIG. 4, to create a seal of increased strength.

To permit the outward spreading of end portion 42 of tubing 12, tubing 12 is retained in die 26 in a position to allow approximately ½ inch of tubing 12 to protrude below second die member 26, as shown in FIG. 2. Tubing 12 is retained in this position by toggle clamp 46. One effective toggle clamp is manufactured by the De Sta Co Corporation of Detroit, Michigan.

As shown in FIG. 3, manipulation of handle 48 of toggle clamp 46 causes the raising of one of a pair of movable clamping blocks 50, 52 which surround tubing 12. Each of the clamping blocks 50, 52 defines a cutaway channel portion 54, 56 for receiving tubular member 12. The channel typically defines a cross-sectional shape similar to the cross-sectional shape of tubular member 12, which in this case is circular, but is of smaller dimension than tubular member 12.

Accordingly, tub 12 is compressed within channel portions 54, 56 for firm retention thereof within the clamping blocks 50 and 52. This arrangement reduces or eliminates the permanent deformation of the tubular member 12 created by the clamping. Accordingly, no marks or indentations are left on the tubing 12 as a result of the clamping.

Toggle clamp 46 is positioned on wall 57, which is carried by frame members 59, 60, for support. Guide rods 62, having spring return means 64, are attached to platen 28, and pass through frame 59 to permit uniform vertical motion of platen 28.

Die energizing unit 58 is appropriately positioned to permit energizing of dies 16, 26, for heat sealing. In the specific disclosure of the drawing, energizing unit 58 is a radio frequency alternating current generation unit, but other forms of die energizing such as ultrasonic energy and the like can also be utilized as desired.

Accordingly, when second die member 26 is advanced downwardly into engagement with first die member 16, as shown in phantom in FIG. 1, energy from unit 58 is applied to the dies through electrical conductors 61, and the outwardly urged end portion 42 of tubing 12 spreads uniformly, flowing into intimate contact with the adjacent portion of sheet member 14. A conventional amount of force is applied by pneumatic piston 29 between the dies, for example, 35 PSIG for a three-inch diameter pistion, and for a tubing 12 having a diameter of ⅜ inch. As a result of the cooperative action of concavely curved junction area 34 and outwardly bevelled bore end portion 44, tubing end 42 is uniformly spread outwardly to form an improved heat-seal of improved strength.

The above has been offered for illustrative purposes only, and is not to be interpreted as limiting the invention of this application, which is as described in the claims below.

That which is claimed is:

1. A die assembly for use in heat-sealing an end of a plastic tubular member to a sheet member positioned in transverse relation thereto, including a first die having a first die face defining a protrusion surrounded by a generally flat face portion of said die face, said protrusion being proportioned to be received in the bore of said tubular member; and a tubular second die for receiving said tubular member, said tubular second die defining a second die face at one end thereof proportioned for cooperative sealing action with said first die face; and means for moving said die faces together with portions of said tubular member and sheet member positioned therebetween for said cooperative sealing action; the improvement comprising, in combination:

said protrusion defining a junction surface with the flat face portion, said surface being concavely curved as measured along planes containing the longitudinal axis of said protrusion, said concavely curved surface defining, in said planes, arcs of closed curves having radii of at least 1/32 inch;

said tubular second die having a bore which defines, as part of said second die face, an outwardly bevelled bore end portion, whereby said outwardly bevelled bore end portion and said concavely curved surface cooperate to facilitate the spreading of said end of the tubular member outwardly over said sheet member during said cooperative sealing action, to create a seal of increased strength.

2. The die assembly of claim 1 in which said arcs of the concavely curved surfaces have radii of 1/16 to ⅛ inch.

3. The die assembly of claim 1 in which a clamp member is positioned to receive said plastic tubular member and hold it in a desired position within said tubular die.

4. The die assembly of claim 3 in which said clamp member includes a pair of movable clamping blocks for pressing together and clamping said plastic tubular member therebetween, each block defining a cut-away channel portion, which channel portions cooperate to form a channel for receiving said plastic tubular member, said channel defining a cross-sectional shape similar to the cross-sectional shape of said tubular member, but of smaller dimension, to reduce permanent deformation in said tubular member created by said clamping.

5. The die assembly of claim 4, in combination with die energizing means for heat sealing.

6. The die assembly combination of claim 5 in which said die energizing means comprises a source of radio frequency radiant energy.

7. The die assembly combination of claim 6 in which said arcs of the concavely curved surfaces have radii of 1/16 to ⅛ inch.

* * * * *